United States Patent
Oh

(10) Patent No.: US 9,641,754 B2
(45) Date of Patent: May 2, 2017

(54) MONITORING CAMERA FOR GENERATING 3-DIMENSIONAL IMAGE AND METHOD OF GENERATING 3-DIMENSIONAL IMAGE USING THE SAME

(75) Inventor: Jae-yoon Oh, Changwon (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 845 days.

(21) Appl. No.: 13/428,342

(22) Filed: Mar. 23, 2012

(65) Prior Publication Data

US 2012/0242787 A1 Sep. 27, 2012

(30) Foreign Application Priority Data

Mar. 25, 2011 (KR) .................. 10-2011-0027016

(51) Int. Cl.
*H04N 13/02* (2006.01)
*H04N 5/232* (2006.01)

(52) U.S. Cl.
CPC ......... *H04N 5/23238* (2013.01); *H04N 5/232* (2013.01); *H04N 13/0239* (2013.01)

(58) Field of Classification Search
CPC ............ H04N 5/23238; H04N 13/0239; G06T 7/0075
See application file for complete search history.

(56) References Cited

U.S. PATENT DOCUMENTS

| | | | |
|---|---|---|---|
| 6,665,003 B1* | 12/2003 | Peleg et al. ...................... | 348/36 |
| 7,176,960 B1* | 2/2007 | Nayar et al. ............. | 348/207.99 |
| 2002/0154812 A1* | 10/2002 | Chen et al. ................... | 382/154 |
| 2005/0069195 A1* | 3/2005 | Uezono .................. | G01C 11/06 382/154 |
| 2007/0253696 A1* | 11/2007 | Nakajima et al. ............. | 396/263 |
| 2008/0260207 A1* | 10/2008 | Nagaoka et al. ............. | 382/103 |
| 2009/0244262 A1* | 10/2009 | Masuda et al. ................. | 348/46 |
| 2011/0149016 A1* | 6/2011 | Kimura ........................... | 348/36 |
| 2011/0234750 A1* | 9/2011 | Lai et al. ........................ | 348/37 |
| 2011/0311102 A1* | 12/2011 | McDaniel et al. ............ | 382/104 |

FOREIGN PATENT DOCUMENTS

| KR | 10-2006-0034497 A | 4/2006 |
|---|---|---|
| KR | 10-2007-0039641 A | 4/2007 |
| KR | 10-2009-0022486 A | 3/2009 |

* cited by examiner

*Primary Examiner* — Zhubing Ren
(74) *Attorney, Agent, or Firm* — Sughrue Mion, PLLC

(57) ABSTRACT

A monitoring camera for generating a 3-dimensional (3D) image and a method of generating a 3D image using the same are provided. The monitoring camera includes: an imaging unit that is configured to laterally rotate and photograph an object to generate at least two images; and a controller that captures overlapping portions of images generated by the imaging unit, and generates a 3-dimensional (3D) image based on the overlapping portions.

15 Claims, 10 Drawing Sheets

MONITORING CAMERA FOR GENERATING 3-DIMENSIONAL IMAGE AND METHOD OF GENERATING 3-DIMENSIONAL IMAGE USING THE SAME

CROSS-REFERENCE TO RELATED PATENT APPLICATION

This application claims priority from Korean Patent Application No. 10-2011-0027016, filed on Mar. 25, 2011, in the Korean Intellectual Property Office, the disclosure of which is incorporated herein in its entirety by reference.

BACKGROUND

1. Field

Methods and apparatuses consistent with the exemplary embodiments relate to a monitoring camera, and more particularly, to a monitoring camera for generating a 3-dimensional (3D) image and a method of generating a 3D image by using one monitoring camera.

2. Description of the Related Art

Monitoring cameras are widely used for security or crime prevention. Mostly, one monitoring camera is installed for surveillance. Thus, a 2-dimensional (2D) image captured by the monitoring camera is displayed on a monitor. The monitoring camera may monitor surroundings while performing a pan operation for rotating 360° in a horizontal direction, a tilt operation for rotating 90° in a vertical direction, and a zoom operation for expanding or reducing the size of an object.

In order to generate three-dimensional (3D) distance information, stereo vision using two cameras is required. In other words, when one monitoring camera is used, a 2D image is displayed on a screen since 3D information about a surveillance space and object cannot be generated despite that an actual surveillance space is 3D. Thus, the 2D image is discordant with a geometrical structure of the actual surveillance space when a function such as a privacy mask, or a pan, tilt, or zoom operation is performed.

This is because the monitoring camera generates 2D image information by using a plane charge-coupled device (CCD) sensor, and thus, 3D information is lost as image information in a 3D space is projected in 2D.

Examples of 3D information about an object include a distance between an object and a camera, a distance between an object and a background, and information about whether an object is spatially moving towards or away from a camera.

Since a monitoring camera in the related art cannot use distance information between an object and a background, i.e., 3D spatial information about an image being captured, a desired performance cannot be obtained while realizing a basic function, such as privacy mask. In other words, the related art monitoring camera monitors in 2D without recognizing a 3D space, such as a close object, a far object, an approaching object, a receding object, a close background, or a far background, and thus, distortedly recognizes a big object, a small object, an object increasing in size, an object decreasing in size, a big background, or a small background.

Such a spatial recognition may not be generated in a fixed monitoring camera instead of a pan-tilt-zoom (PTZ) camera. However, in the PTZ camera performing operations such as up-down-right-left movement, expansion, and reduction, the loss of 3D information in a surveillance area may cause problems.

SUMMARY

One or more exemplary embodiments provide a monitoring camera for generating a 3-dimensional (3D) image, and a method of generating a 3D image by using the monitoring camera.

According to an aspect of an exemplary embodiment, there is provided a monitoring camera for monitoring an object, the monitoring camera including: an imaging unit for photographing the object while laterally rotating; and a controller for capturing images overlapped with a time difference from among images generated by the imaging unit, and generating a 3-dimensional (3D) image by composing the overlapped images.

The controller may include: a panning driver for laterally rotating the imaging unit; an angle of view setter for setting an angle of view at which the imaging unit photographs the object; a crop image number setter for setting an overlap angle of neighboring images while generating a plurality of images by photographing the object at least twice with the set angle of view; a capturing unit for generating a plurality of crop images by capturing overlapped images of the neighboring images; and a composing unit for generating a 3D image of the object by composing the plurality of crop images into one continuous image.

The imaging unit may convert the captured images into an analog signal and transmit the analog signal to the controller. The overlap angle of the neighboring images may be changeable by a user.

The panning driver may rotate the imaging unit by 360°, and the composing unit may generate an omnidirectional 3D panoramic image.

Space information about the object may be obtained from the 3D image. The 3D image may be generated by the time difference of the neighboring images.

According to another aspect of an exemplary embodiment, there is provided a method of generating a 3-dimensional (3D) image by using a monitoring camera for generating a 3D image by photographing an object, the method including: setting an angle of view for photographing the object; photographing the object with the set angle of view while laterally rotating the monitoring camera; capturing an image including overlapped images generated via the photographing; and generating a 3D image by composing the captured image.

The method may further include, after the setting of the angle of view, setting an overlap angle of neighboring images while generating a plurality of images by photographing the object at least twice at the set angle of view.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Figure 1:
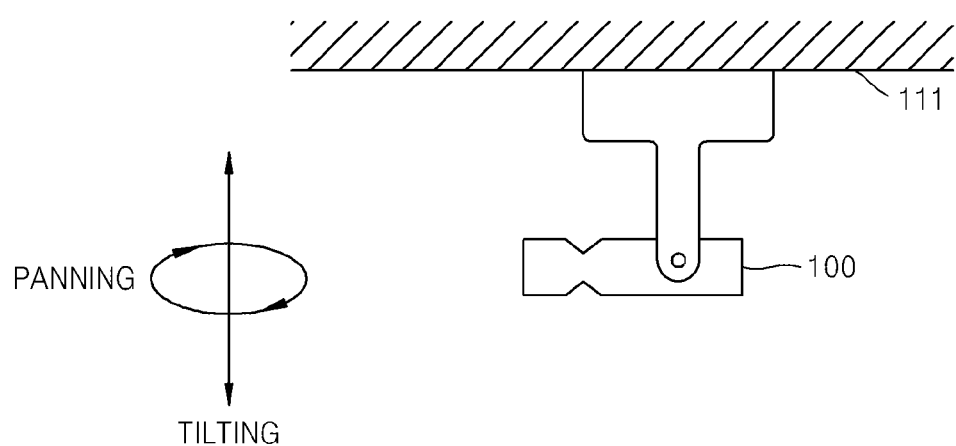
FIG. 1 is a diagram of an exterior of a monitoring camera according to an exemplary embodiment.

Hereinafter, exemplary embodiments will be described more fully with reference to the accompanying drawings. In the drawings, like reference numerals denote like elements.

Figure 2:
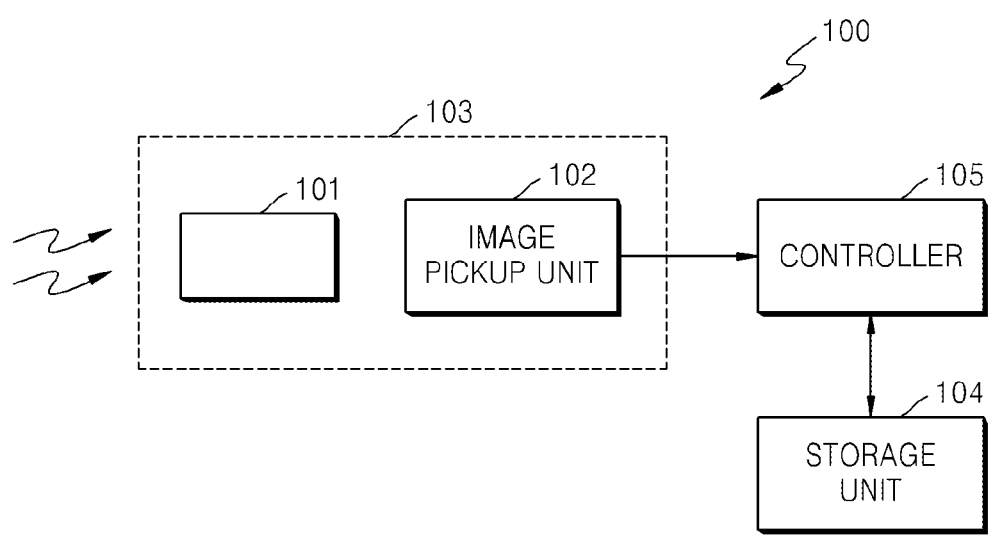
FIG. 2 is a block diagram of a monitoring camera according to an exemplary embodiment.

FIG. 1 is a diagram of an exterior of a monitoring camera 100 according to an exemplary embodiment and FIG. 2 is a block diagram of the monitoring camera 100.

Referring to FIG. 1, the monitoring camera 100 may be fixed to a particular space, such as a ceiling 111, for safe photographing, and may perform a panning operation for laterally rotating 360°, a tilting operation for rotating up and down 90°, or a zooming operation for expanding or reducing the size of an object in an image captured by the monitoring camera 100.

Referring to FIG. 2, the monitoring camera 100 includes an imaging unit 103, a storage unit 104, and a controller 105.

The term "unit," as used herein, means, but is not limited to, a software or hardware component, such as a Field Programmable Gate Array (FPGA) or an Application Specific Integrated Circuit (ASIC), which performs certain tasks. A unit may advantageously be configured to reside in the addressable storage medium and to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented so as to execute one or more Central Processing Units (CPUs) in a device.

The imaging unit 103 photographs an object and transmits an image of the object to the controller 105. The imaging unit 103 may include a lens system 101 including at least one lens and through which the image is penetrated, and an image pickup unit 102 including a plurality of image pickup devices for converting and outputting the image from the lens system 101 to an electric signal.

The lens system 101 may include a zoom lens (not shown) having a zoom function and a focus lens (not shown) having a focus adjusting function. The lens system 101 may also include an optical low pass filter (not shown) for removing optical noise.

The image pickup unit 102 may include a charge-coupled device (CCD) or a complementary metal oxide semiconductor (CMOS) to convert the image from the lens system 101 to an analog signal and transmit the analog signal to the controller 105.

The controller 105 may convert analog image data output from the imaging unit 103 to digital data and process the digital data. The controller 105 may generate 3D image data by processing image data. The controller 105 controls a panning operation, a tilting operation, a zooming operation, and a photographing operation of the monitoring camera 100. An image output from the controller 105 may be stored in a storage unit 104, displayed on a monitor (not shown), or transmitted to another device via a network. The controller 105 may be provided as an individual unit that is separate from the monitoring camera 100. The controller 105 will now be described in detail with reference to FIG. 3.

Figure 3:
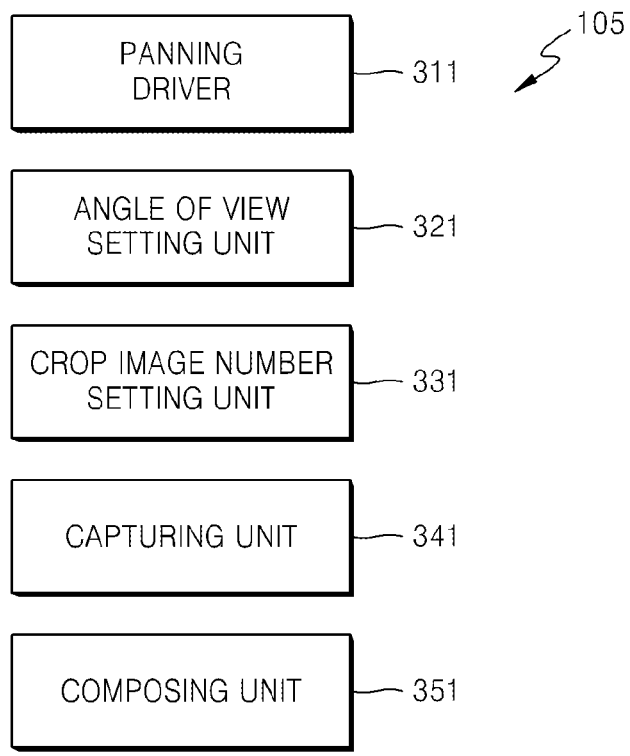
FIG. 3 is a block diagram of a controller of FIG. 2, according to an exemplary embodiment.

FIG. 3 is a block diagram of the controller 105 of FIG. 2, according to an exemplary embodiment. Referring to FIG. 3, the controller 105 includes a panning driver 311, an angle of view setting unit 321, a crop image number setting unit 331, a capturing unit 341, and a composing unit 351.

The panning driver 311 laterally rotates the monitoring camera 100 up to 360°. In other words, the panning driver 311 may photograph an object while laterally and omnidirectionally rotating the monitoring camera 100. A rotating speed and a rotating range of the monitoring camera 100 may be changed by a user. The rotating of the monitoring camera 100 means that the imaging unit 103 of the monitoring camera 100 rotates. In order for the panning driver 311 to pan the monitoring camera 100, a pan motor (not shown) may be included in the monitoring camera 100. The pan motor pans the monitoring camera 100 to the side.

Figure 4:
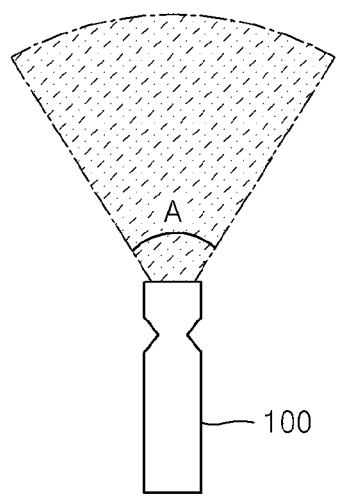
FIG. 4 is a diagram for describing an angle of view of a monitoring camera according to an exemplary embodiment.

The angle of view setting unit 321 sets an angle of view at which the monitoring camera 100 photographs the object. Referring to FIG. 4, the monitoring camera 100 photographs the object while laterally rotating 360°. An angle between a surface of the object and the monitoring camera 100 is called an angle of view A. The number of photographs taken to capture a scene during the 360° rotation of the monitoring camera is determined by the angle of view A. For example, when the angle of view A is 90°, the monitoring camera 100 may photograph 360° by photographing four times, and when the angle of view A is 60°, the monitoring camera 100 may photograph 360° by photographing 6 times. As such, a set value of the angle of view A of the monitoring camera 100 may be changed by a user.

Figure 7:
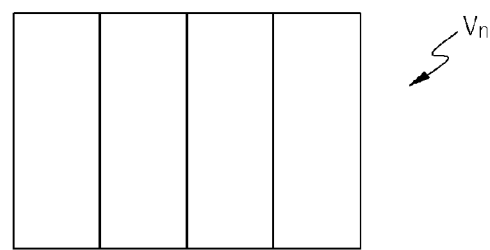
FIG. 7 illustrates one image divided into 4 crop images.

The crop image number setting unit 331 sets an overlap angle of neighboring images when a plurality of images are generated by photographing the object at least twice by using the angle of view A set by the angle of view setting unit 321. The number of crop images is determined by the overlap angle. A crop image is obtained by capturing the overlapped images of the neighboring images. For example, when the angle of view A of the monitoring camera 100 is 60° and the number of crop images is set to 4, the overlap angle is a value obtained by dividing the angle of view A by the number of crop images, i.e., 15°. FIG. 7 illustrates an example of obtaining 4 crop images from one image. Here, the overlap angle of the neighboring images is set to ¼ of the angle of view A. The number of crop images may be changed by the user and may be set according to the characteristics of the object.

Figure 5:
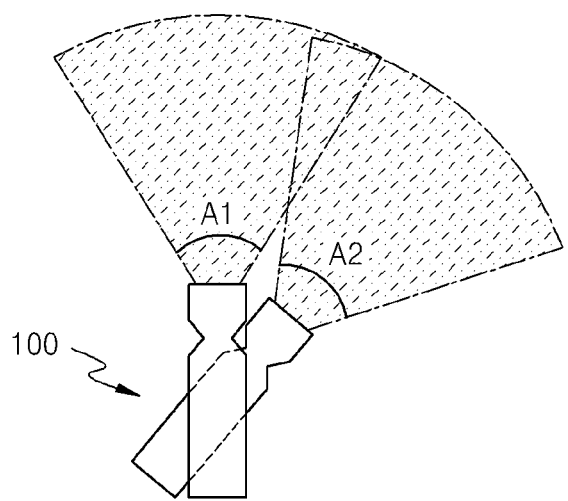
FIG. 5 is a diagram for describing a photographing method of obtaining two images as a monitoring camera rotates according to an exemplary embodiment.
Figure 6:
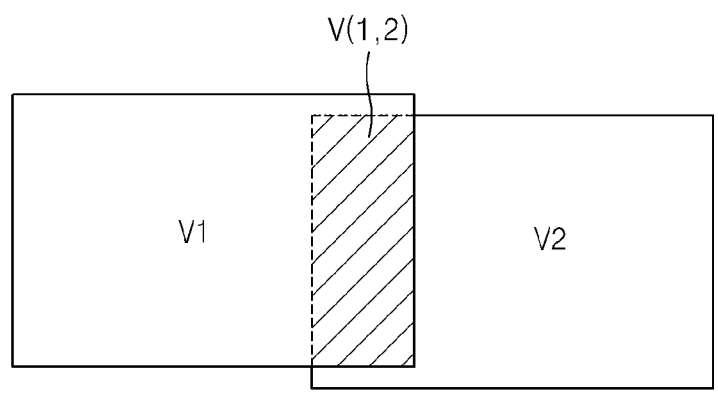
FIG. 6 illustrates two overlapped images generated by using the photographing method of FIG. 5.

The capturing unit 341 generates a plurality of crop images by capturing the overlapped images of the neighboring images. In other words, the capturing unit 341 only captures overlapped images from among images captured as the monitoring camera 100 rotates 360°. Referring to FIGS. 5 and 6, when the monitoring camera 100 obtains two images V1 and V2 by photographing the object twice while rotating, overlapped images V(1,2) of the two images V1 and V2 may be generated, and the capturing unit 341 captures the overlapped images V(1,2). The overlapped images V(1,2) have a time difference. That is, the monitoring camera 100 first obtains the image V1 captured at an angle of view A1 and then obtains the image V2 captured at an angle of view A2. Accordingly, there is a time difference between the image V1 captured at the angle of view A1 and the image V2 captured at the angle of view A2, and thus there is a time difference between the overlapped images V(1,2). A crop image obtained by composing the overlapped images V(1,2) having the time difference is a 3D image.

The number of crop images determines the size of the crop images. A plurality of crop images is obtained by images captured at one angle of view. For example, as shown in FIG. 7, there may be 4 crop images obtained by an image Vn captured at one angle of view.

Figure 8:
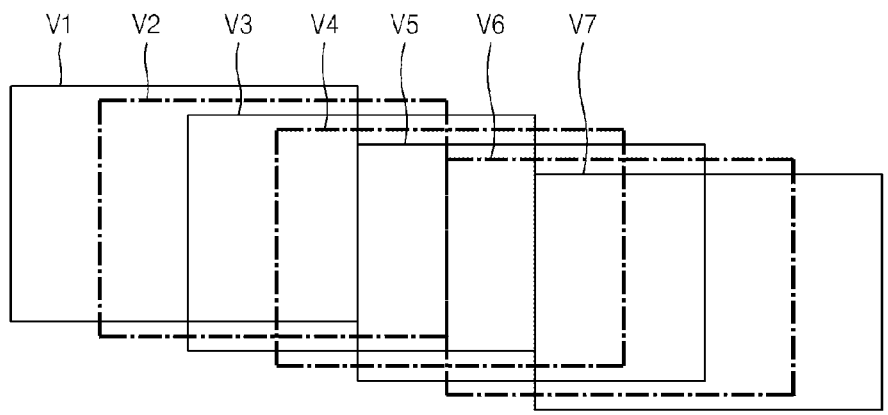
FIG. 8 illustrates a plurality of images obtained by reducing a rotation angle of a monitoring camera according to an exemplary embodiment.

Alternatively, as shown in FIG. 8, a plurality of first through seventh images V1 through V7 may be obtained when the object is photographed by the monitoring camera 100 by reducing a rotation angle. In other words, FIG. 8 illustrates an example of obtaining 4 crop images from one image.

Figure 9:
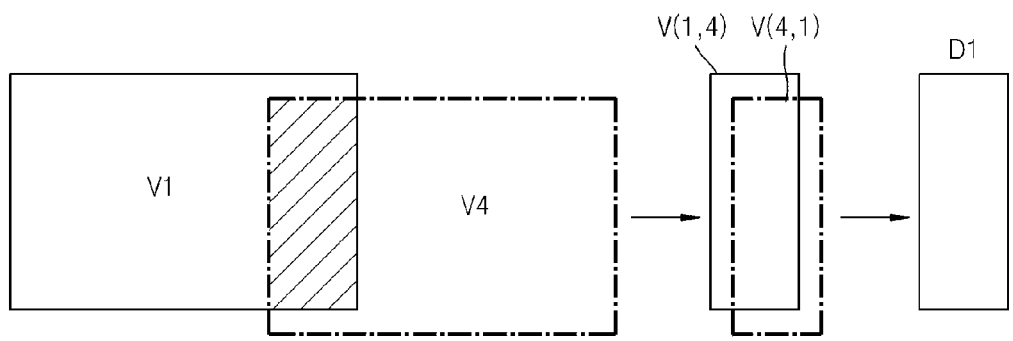
FIGS. 9 through 12 are diagrams for describing a method of generating crop images by capturing overlapped images in FIG. 8 according to an exemplary embodiment.

As shown in FIG. 9, a first crop image D1 is obtained by capturing overlapped images V(1,4) and V(4,1) of the first and fourth images V1 and V4.

Figure 10:
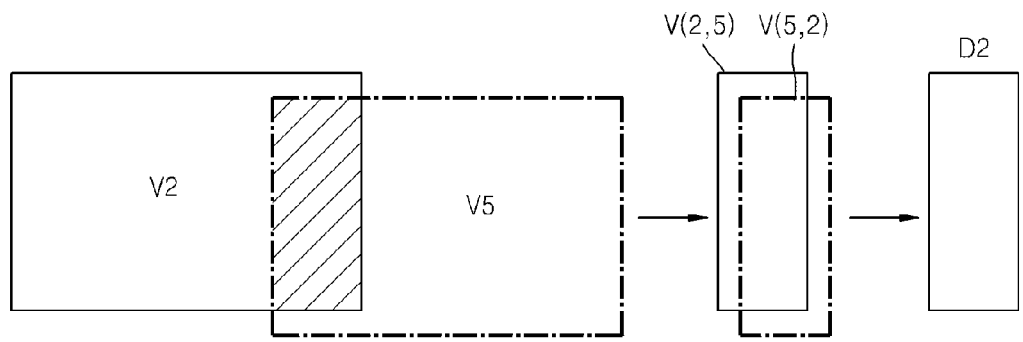

As shown in FIG. 10, a second crop image D2 is obtained by capturing overlapped images V(2,5) and V(5,2) of the second and fifth images V2 and V5.

Figure 11:
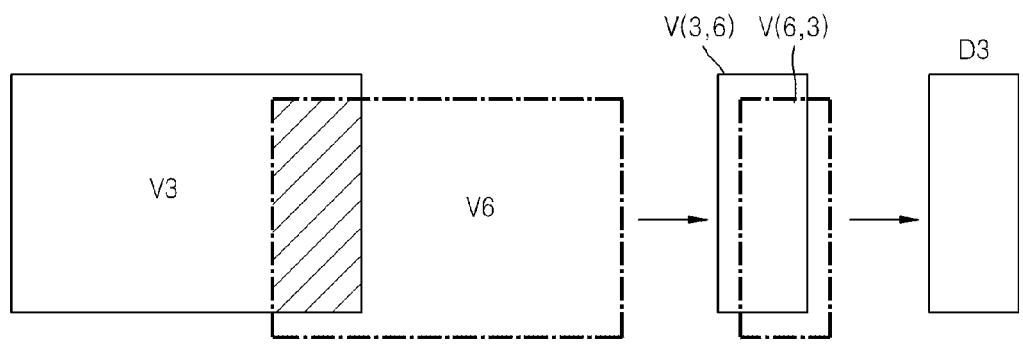

As shown in FIG. 11, a third crop image D3 is obtained by capturing overlapped images V(3,6) and V(6,3) of the third and sixth images V3 and V6.

Figure 12:
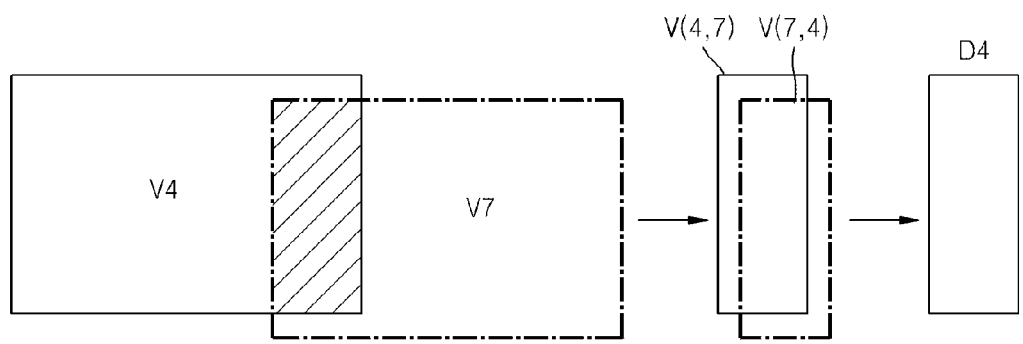

As shown in FIG. 12, a fourth crop image D4 is obtained by capturing overlapped images V(4,7) and V(7,4) of the fourth and seventh images V4 and V7.

Figure 13:
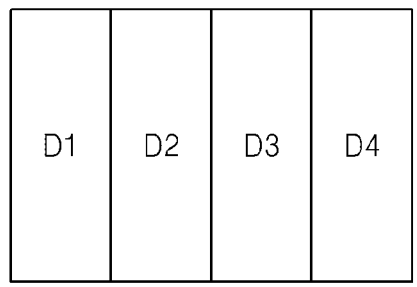
FIG. 13 illustrates an image generated by composing the crop images generated by using the method of FIGS. 9 through 12 according to an exemplary embodiment.

The composing unit 351 generates a 3D image shown in FIG. 13 by sequentially composing the first through fourth crop images D1 through D4 captured by the capturing unit 341. For example, the 3D image of FIG. 13 is obtained by sequentially composing the first through fourth crop images D1 through D4 of FIGS. 9 through 12.

Then, when the crop images of the images obtained by photographing the object while the monitoring camera 100 rotates 360° are sequentially composed, an omnidirectional 3D panoramic image is generated.

Spatial information of the object may be extracted when such an omnidirectional 3D panoramic image is analyzed.

Figure 14:
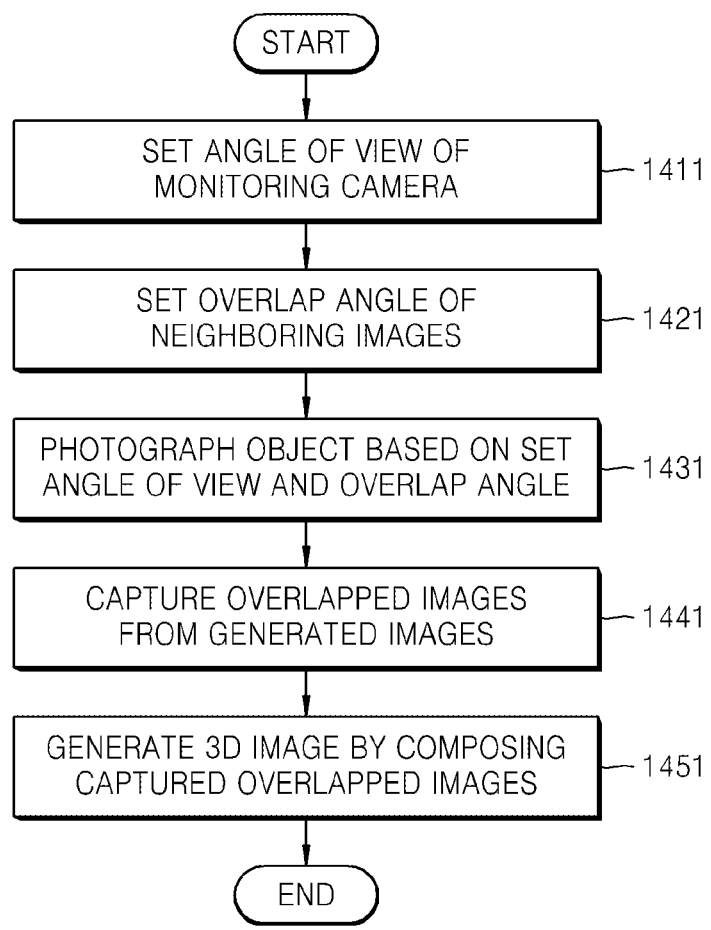
FIG. 14 is a flowchart illustrating a method of generating a 3-dimensional (3D) image by using a monitoring camera, according to an exemplary embodiment.

FIG. 14 is a flowchart illustrating a method of obtaining a 3D image by using the monitoring camera 100, according to an exemplary embodiment. Referring to FIG. 14, the method includes five operations. The method of the monitoring camera 100 will now be described with reference to FIGS. 1 through 13.

In operation 1411, the monitoring camera 100 sets an angle of view for photographing an object.

In operation 1421, an overlap angle of neighboring images is set.

In operation 1431, the monitoring camera 100 laterally rotates to photograph the object based on the set angle of view and overlap angle.

In operation 1441, the monitoring camera 100 captures overlapped images of the generated images.

In operation 1451, the monitoring camera 100 generates a 3D image by composing the captured overlapped images.

According to the method of the exemplary embodiment, one monitoring camera 100 may generate a 3D image.

Figure 15:
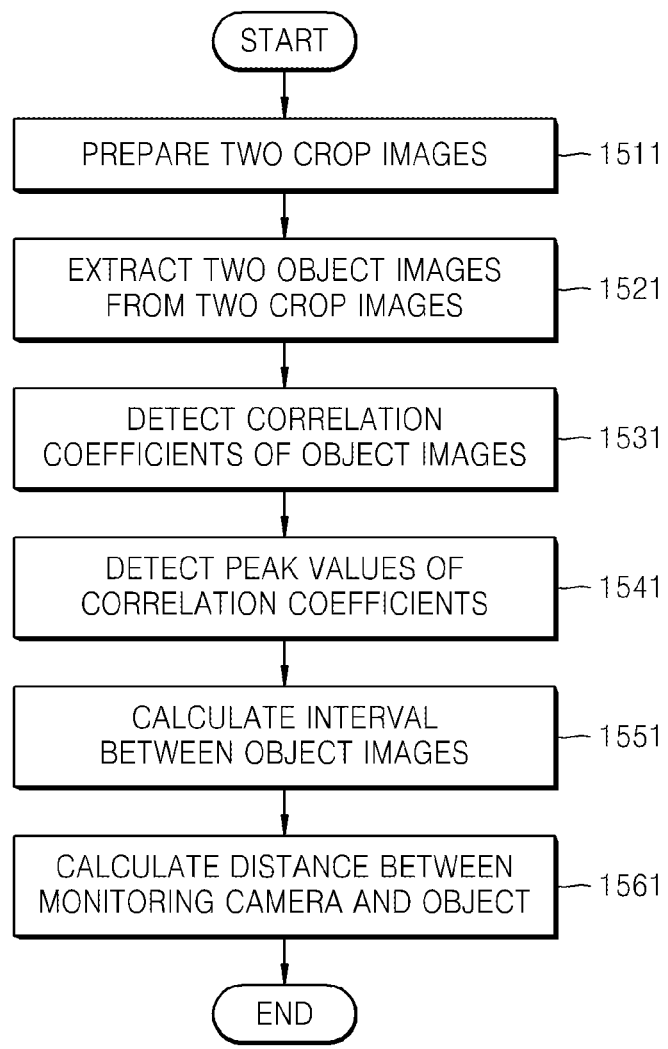
FIG. 15 is a flowchart illustrating a method of detecting a distance between a monitoring camera and an object by using a detected 3D image, according to an exemplary embodiment.

FIG. 15 is a flowchart illustrating a method of detecting a distance between the monitoring camera 100 of FIG. 4 and a certain object (not shown) by using a detected 3D image, according to an exemplary embodiment. Referring to FIG. 15, the method includes operations 1511 through 1561.

Figure 16A:
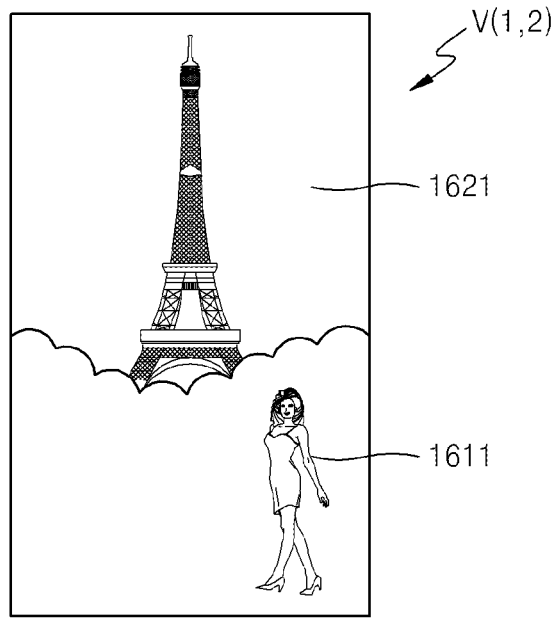
FIGS. 16A and 16B illustrate crop images generated by photographing a certain object.
Figure 16B:
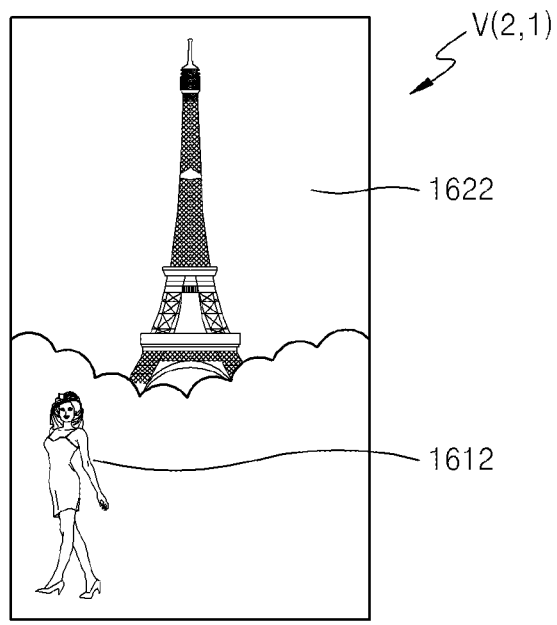

In operation 1511, two crop images V(1,2) and V(2,1) generated by photographing the certain object are prepared. The crop images V(1,2) and V(2,1) may obtained by using the method of FIGS. 4 and 5. Referring to FIGS. 16A and 16B, the two crop images V(1,2) and V(2,1) generated by photographing the certain object include object images 1611 and 1612 and background images 1621 and 1622, respectively.

Figure 17A:
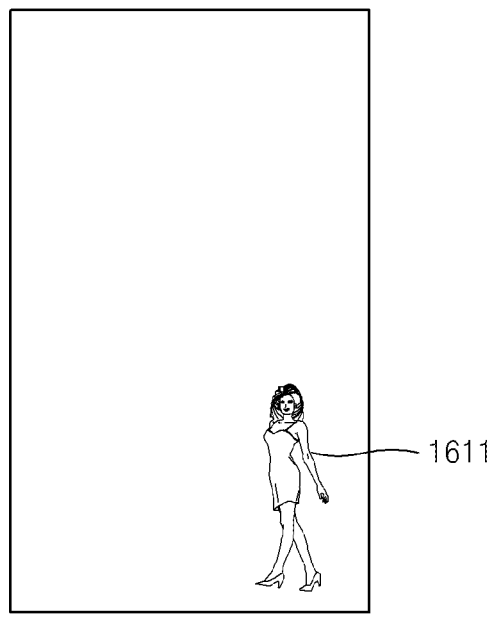
FIG. 17A illustrates an object image extracted by removing a background image from the crop image of FIG. 16A.
Figure 17B:
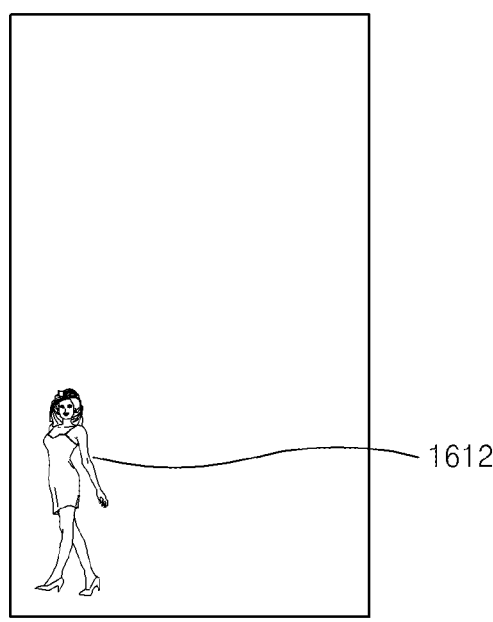
FIG. 17B illustrates an object image extracted by removing a background image from the crop image of FIG. 16B.

In operation 1521, the two object images 1611 and 1612 are extracted by removing the background images 1621 and 1622 from the two crop images V(1,2) and V(2,1). FIG. 17A illustrates the object image 1611 extracted by removing the background image 1621 from the crop image V(1,2) of FIG. 16A, and FIG. 17B illustrates the object image 1612 extracted by removing the background image 1622 from the crop image V(2,1) of FIG. 16B.

In operation 1531, correlation coefficients c1 and c2 between object images are detected from the extracted object images 1611 and 1612. Here, Equation 1 below may be used to detect the correlation coefficients c1 and c2.

$$c_1[n] = (\text{object1} * \text{object2})[n] = \sum_{m=-\infty}^{\infty} \text{object1}^*[m]\text{object2}[n+m]$$

$$c_2[n] = (\text{object2} * \text{object1})[n] = \sum_{m=-\infty}^{\infty} \text{object2}^*[m]\text{object1}[n+m]$$

[Equation 1]

Figure 18A:
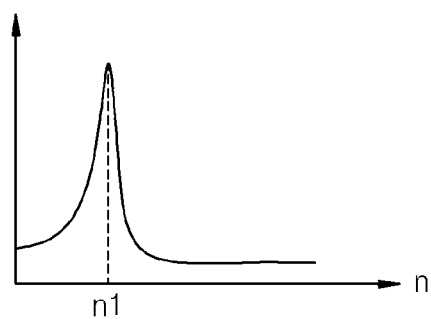
FIG. 18A is a graph showing a peak value of a correlation coefficient of the object image of FIG. 17A.
Figure 18B:
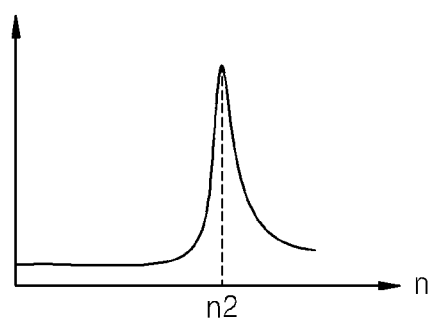
FIG. 18B is a graph showing a peak value of a correlation coefficient of the object image of FIG. 17B.

In operation 1541, peak values n1 and n2 of the correlation coefficients c1 and c2 are detected. Examples of the peak values n1 and n2 are shown in graphs of FIGS. 18A and 18B.

In operation 1551, an interval s between the object images 1611 and 1612 is calculated by using the peak values n1 and n2. The interval s may be calculated by using Equation 2 below.

$$s = \text{abs}(n1-n2)$$ [Equation 2]

Here, abs denotes an absolute value.

In operation 1561, a distance between the monitoring camera 100 of FIG. 4 and the certain object is calculated by applying the interval s between the object images 1611 and 1612. A general method may be used to calculate the distance between the monitoring camera 100 of FIG. 4 and the certain object by applying the interval s between the object images 1611 and 1612.

As described above, the distance between the monitoring camera 100 of FIG. 4 and the certain object may be calculated by using a 3D image generated according to an exemplary embodiment, and a mask may be set only on the certain object by using the distance. Accordingly, a privacy mask performance may be remarkably improved.

According to an exemplary embodiment, a 3D image is generated by capturing and composing two different images having a time difference while a single monitoring camera photographs an object.

Also, spatial information of the object can be extracted via the 3D image captured by using the single monitoring camera.

In addition, a mask can be set only on a certain object by using the extracted spatial information. Accordingly, a privacy mask performance can be remarkably improved.

While exemplary embodiments have been particularly shown and described, it will be understood by those of ordinary skill in the art that various changes in form and details may be made therein without departing from the spirit and scope of the present invention as defined by the following claims.

What is claimed is:

1. A monitoring camera comprising:
a camera configured to laterally rotate and photograph an object at different times to generate a plurality of images; and
a processor configured to generate a plurality of crop images by cropping overlapping portions of the plurality of images generated by the camera, and generate a 3-dimensional (3D) image by composing the plurality of crop images;
wherein the 3D image includes depth information of the object, the depth information being obtained based on a distance between positions of the object in the overlapping portions of the at least two images, and
wherein each crop image is generated by cropping only overlapping portions of a first image and a second image of the plurality of images, the first image and the second image being not immediately adjacent to each other among the plurality of images.

2. The monitoring camera of claim 1, wherein the processor comprises:
a panning driver that causes the camera to laterally rotate;
an angle of view setting unit that sets an angle of view at which the camera photographs the object;
a crop image number setting unit that sets an overlap angle by which the first and second images being not immediately adjacent to each other photographed by the camera within the angle of view overlap;
a capturing unit that generates the plurality of crop images; and
a composing unit that generates the 3D image by composing the plurality of crop images into one image.

3. The monitoring camera of claim 1, wherein the camera converts the plurality of images into an analog signal and transmits the analog signal to the processor.

4. The monitoring camera of claim 2, wherein the overlap angle is a value obtained by dividing the angle of view by a number of crop images.

5. The monitoring camera of claim 1, wherein the processor calculates an interval between positions of the object in the two crop images, and calculates a distance between the monitoring camera and the object using the interval between the positions of the object in the two crop images.

6. The monitoring camera of claim 2, wherein the 3D image is generated based on a time difference between the first and second images.

7. The monitoring camera of claim 2, wherein the panning driver causes the camera to laterally rotate 360 degrees.

8. The monitoring camera of claim 1, wherein the at least two images are generated by photographing the object at different angles with respect to the camera.

9. The monitoring camera of claim 2, wherein the at least two images are generated by photographing the object at different angles within the angle of view.

10. The monitoring camera of claim 1, wherein the processor is providable as an individual unit that is separate from the monitoring camera.

11. The monitoring camera of claim 1, wherein the processor measures a distance between the monitoring camera and the object by using a method comprising:
extracting at least one object image from each of the two crop images by removing background images from the two crop images;
detecting correlation coefficients between the extracted object images;
detecting peak values of the correlation coefficients;
calculating an interval between positions of the object from the object images by using the peak values; and
calculating the distance between the monitoring camera and the object using the interval between the positions of the object from the object images.

12. A method of generating a 3-dimensional (3D) image by using a monitoring camera to photograph an object, the method comprising:
setting an angle of view of the monitoring camera for photographing the object;
photographing the object at least twice within the angle of view at different times by laterally rotating the monitoring camera to generate a plurality of images;
generating a plurality of crop images by cropping overlapping portions of the plurality of images; and
generating a 3D image by composing the plurality of crop images into one image,
wherein the 3D image includes depth information of the object, the depth information being obtained based on a distance between positions of the object in the overlapping portions of the at least two images,
wherein each crop image is generated by cropping only overlapping portions of a first image and a second image of the plurality of images, the first image and the second image being not immediately adjacent to each other among the plurality of images.

13. The method of claim 12, further comprising:
setting an overlap angle by which the first and second images being not immediately adjacent to each other photographed within the angle of view overlap.

14. The method of claim 12, wherein the generating the 3D image comprises:
generating an omnidirectional 3D panoramic image by composing the plurality of crop images based on the plurality of images obtained by rotating the monitoring camera by 360°.

15. The method of claim 12, further comprising:
extracting at least one object image from each of the two crop images by removing background images from the two crop images;
detecting correlation coefficients between the extracted object images;

detecting peak values of the correlation coefficients;
calculating an interval between positions of the object from the object images by using the peak values; and
calculating a distance between the monitoring camera and the object using the interval between the positions of the object from the object images.

* * * * *